United States Patent [19]

Saitoh et al.

[11] Patent Number: 4,518,987
[45] Date of Patent: May 21, 1985

[54] THREE-COLOR COPYING MACHINE

[75] Inventors: Hiroyuki Saitoh; Masami Kurata, both of Kanagawa, Japan

[73] Assignee: Fuji Xerox Company, Limited, Tokyo, Japan

[21] Appl. No.: 482,643

[22] Filed: Apr. 6, 1983

[30] Foreign Application Priority Data

Apr. 6, 1982 [JP] Japan ............................. 57-55999

[51] Int. Cl.³ .............................................. H04N 1/40
[52] U.S. Cl. ................................................... 358/75
[58] Field of Search .................. 358/75, 78, 79, 80; 346/76 PH; 355/4, 32

[56] References Cited

U.S. PATENT DOCUMENTS

| 4,442,452 | 4/1984 | Kurata | 358/75 |
| 4,458,264 | 7/1984 | Tamura | 358/75 |
| 4,476,486 | 10/1984 | Ayata | 358/75 |

*Primary Examiner*—Michael A. Masinick
*Attorney, Agent, or Firm*—Sughrue, Mion, Zinn, Macpeak and Seas

[57] ABSTRACT

A three-color copying machine is made capable of copying in black, a chromatic color and the complement thereof to improve visual image quality while using only two image sensors. Logic circuitry is used to separate the image signals into printing signals for each color.

6 Claims, 9 Drawing Figures

THREE-COLOR COPYING MACHINE

BACKGROUND OF THE INVENTION

This invention relates to a three-color copying machine capable of reading three colors of an original and recording them, and more particularly to a three-color copying machine which uses two image sensors to read three different colors.

When the same optical image is formed on two image sensors and the images are different from one another in wavelength, processing the resultant image signals provides image signals of two colors.

FIG. 1 shows a reading section of a conventional copying machine for recording data in two colors, namely, black and red. An original 3 is subjected to slit exposure by a pair of fluorescent lamps 1 and 2, and is subjected to auxiliary scanning in the direction of the arrow. A light beam reflected from the original 3 passes through a lens 4 and is then split into two light beams proceeding in two directions by a half-mirror 5, as a result of which the same optical image is formed on first and second image sensors 6 and 7. The first image sensor 6 subjects the optical image to photo-electric conversion irrespective of wavelength, to provide an image signal 8 for each line. On the other hand, the second image sensor 7 subjects the optical image, the red wavelength components of which have been absorbed by a cyan filter 9 disposed thereabove, to photo-electric conversion, to provide an image signal 11 for each line. These image signals 8 and 11 are supplied to a color separating circuit 12, where they are subjected to binary-encoding and logical operations. As a result, a red image signal 13 representing red data and a black image signal 14 representing black data are obtained.

With the above-described copying machine, colors other than the two given recording colors of course cannot be recorded as they are; that is, such colors are not recorded at all or are recorded in one of the two recording colors. Accordingly, the resultant copy gives an impression which it is considerably different from the original.

SUMMARY OF THE INVENTION

In view of the foregoing, an object of this invention is to provide a three-color copying machine in which two image sensors are employed, such that three colors; black, any other color and the complemetary color of that color, may be read and recorded.

DETAILED DESCRIPTION OF THE PREFERRED EMBODIMENTS

Figure 1:
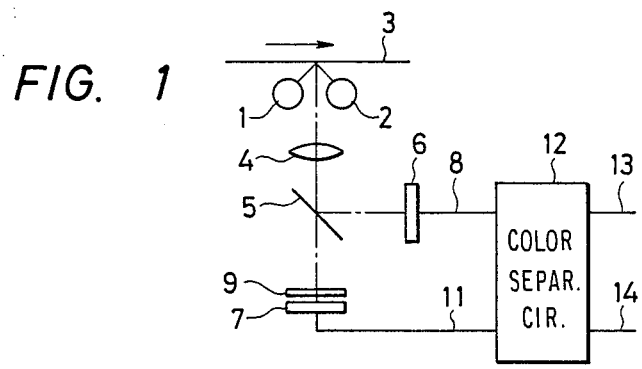
FIG. 1 is an explanatory diagram outlining the arrangement of a conventional copying machine having two image sensors.
Figure 2:
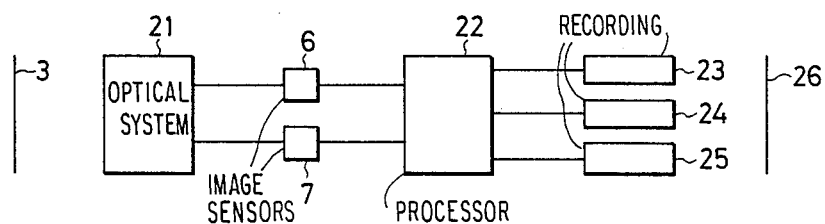
FIG. 2 is a block diagram illustrating the principles of this invention.

In the copying machine of the invention, as shown in FIG. 2, an optical system 21 is used to form the original image of an original 3 on first and second image sensors 6, 7. The optical system 21 has two different wavelength selecting means: first wavelength selecting means for selecting the wavelength components of a particular color other than black, and second wavelength selecting means for selecting the wavelength components of the color complementary to that particular color. Light beams passed through these wavelength selecting means reach the first and second image sensors 6 and 7, respectively. The image sensors 6 and 7 output image signals, which are supplied to a signal processing section 22, where image signals in black, the particular color and the complementary color are formed. These image signals are supplied to respective recording sections 23, 24 and 25, to record data in three colors on the recording sheet 26.

This invention will now be more specifically described with reference to an exemplitive embodiment thereof.

Figure 3:
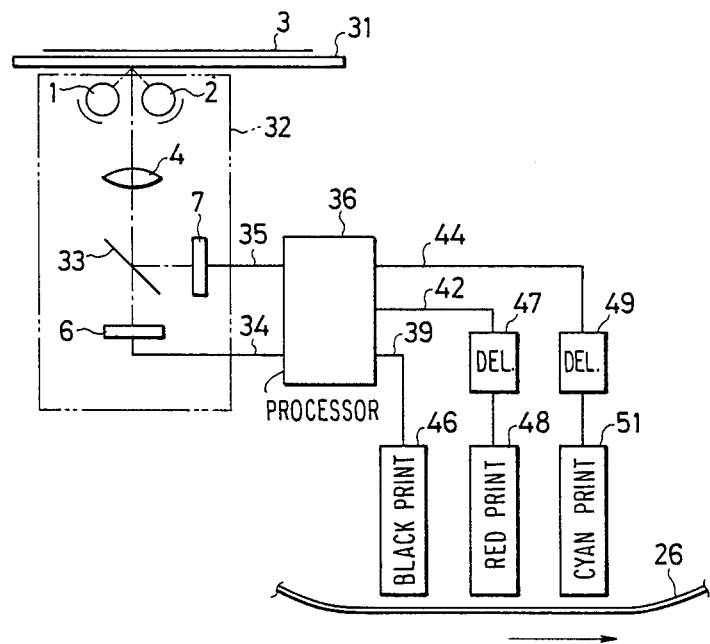
FIG. 3 is an explanatory diagram outlining the arrangement of a three-color copying machine according to the invention.

FIG. 3 shows the essential components of the three-color copying machine according to the invention. An original 3 is placed on a transparent glass platen 31 with the reading surface facing downwardly. Sentences, figures, etc. in black, red and cyan are provided on the reading surface of the original 3. A scanner unit 32 is provided slightly below the glass platen in a manner such that it can reciprocate freely. A pair of fluorescent lamps 1 and 2 are arranged in the upper part of the scanner unit 32 so that the original is subjected to slit exposure in the main scanning direction (or in the direction perpendicular to the direction of movement of the scanner unit 32). A light beam reflected from the original 3 reaches a dichroic mirror 33 through a lens 4. The dichroic mirror 33 transmits the red wavelength components of the visible rays and reflects the remaining light. The transmitted rays (red rays) form an image on the first image sensor 6 and are subjected to photo-electric conversion for each line. The reflected rays form an image on a second image sensor 7 and are subjected to photo-electric conversion for each line similarly to the above-described case. Thus, the image sensors 6 and 7 output image signals 34 and 35 in a serial manner, which are applied to a signal processing section 36.

Figure 4:
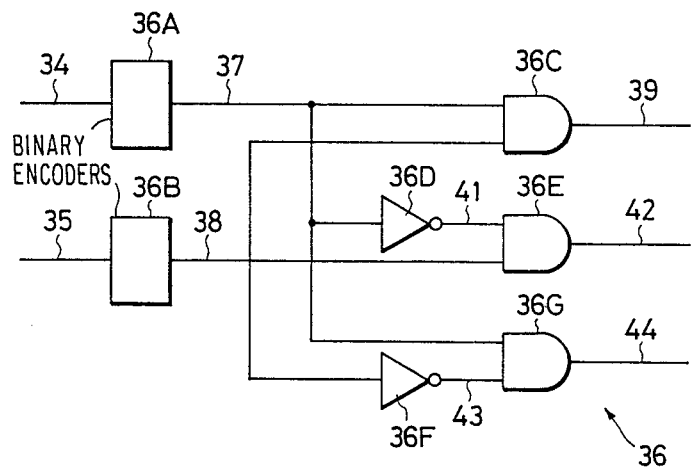
FIG. 4 is a block diagram showing one example of a signal processing section of FIG. 3.

FIG. 4 is a circuit diagram showing the signal processing section in detail. The signal processing section 36 has a first binary-encoding circuit 36A for binary-encoding the output image signal 34 of the first image sensor 6, and a second binary-encoding circuit 36B for binary-encoding the output image signal 35 of the second image sensor 7. The first binary-encoding circuit 36A outputs a first digital image signal 37, while the second binary-encoding circuit 36B outputs a second digital image signal 38. These digital image signals 37 and 38 are ANDed by a first AND circuit 36C, which in turn outputs a black image signal 39. On the other hand, the first digital image signal 37 is applied through an inverter 36D, as a first digital image signal 41, to one input terminal of a second AND circuit 36E, while the second digital image signal 38 is applied directly to the other input terminal of the AND circuit 36E, as a result of which the AND circuit 36E outputs a red image signal 42. Furthermore, the first digital image signal 37 is applied directly to one input terminal of a third AND circuit 36G, while the second digital image signal 38 is applied through an inverter 36F, as a second digital image signal, to the other input terminal of the AND circuit 36G, as a result of which the AND circuit 36G outputs a cyan image signal 44.

The principle of obtaining the image signals of the three desired colors will now be described in general form.

Figure 5:
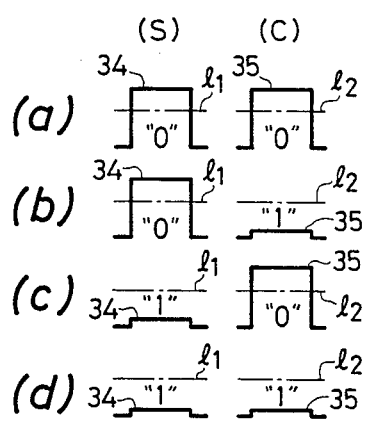
FIGS. 5(a)–5(d) are explanatory diagrams showing color image signals outputted by two image sensors in FIG. 3 and the logical states of these signals as binary-encoded.

It is assumed that image data are provided in a particular color S, its complementary color C and black B on a white sheet (original). Furthermore, it is assumed that the particular color S and the complementary color C are separated from each other by the dichroic mirror or filter, and the particular color S is applied to the first sensor 6 while the complementary color C is applied to the second sensor 7. When that part of the original where no image data is provided, i.e., the white part, is read, levels of the first and second image signals 34 and 35 representing the particular color S and the complementary color C are higher than threshold levels $l_1$ and $l_2$, respectively, as shown in FIG. 5(a). If the presence of image data is represented by a logic level "1" and the absence thereof by a logic level "0" then in this case the digital signals 37 and 38 for the two colors are at the logic level "0" (hereinafter referred to merely as "0").

When a part in the particular color S is read, the level of the first image signal 34 representing the particular color is higher than the threshold level $l_1$, as shown in FIG. 5(b). On the other hand, in principle, no complementary color component is included, and therefore the level of the second image signal 25 representing the complementary color C is lower than the threshold level $l_2$. In this case, the first digital signal 37 is at "0", while the second digital signal 38 is at "1".

In contrast, when a part in the complementary color C is read, the level of the first image signal 34 is lower than the threshold level $l_1$ while the level of the second image signal 35 is higher than the threshold level $l_2$, as shown in FIG. 5(c). In this case, the first digital image signal 37 is at "1", while the second digital image signal 38 is at "0".

When the part in black B is read, the level of the first image signal 34 is lower than the threshold level $l_1$ and the level of the second image signal 35 is also lower than the threshold level $l_2$, as shown in FIG. 5(d). In this case, both the first and second digital image signals 37 and 38 are at "1".

Thus, it can be understood that the particular color, the complementary color and black can be represented via the following logical operation.

Particular color = $\bar{S} \cdot C$
Complementary color = $S \cdot \bar{C}$
Black = $S \cdot C$ where S and $\bar{S}$ are the logical states of the first digital image signal 37, and C and $\bar{C}$ are the logical states of the second digital image signal 38.

Figure 6:
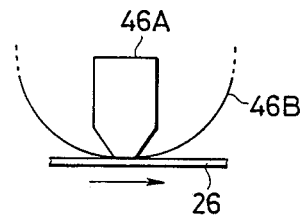
FIG. 6 is a diagram showing the basics of a black printing section in FIG. 3.

The above-described logic operations are performed by the logic circuit section shown in FIG. 4. The black image signal 39 outputted by the first AND circuit 36C is directly applied to a black printing section 46. The black printing section 46, as shown in FIG. 6, comprises a thermal head 46A; and an ink donor sheet 46B for supplying thermally transferrable black ink to the thermal head 46A. A recording sheet 26 is conveyed along the array of heat generating elements of the thermal head in the direction of the arrow (or in the auxiliary scanning direction). When in this condition, the thermal head 46A selectively generates heat for black image data with the aid of the image signal 39, the black ink is fluidized or sublimated by the heat thus generated so as to be transferred onto the recording sheet. Thus, data is recorded in black.

On the other hand, the red image signal 42 outputted by the second AND circuit 36E is applied to a red image signal delay circuit 47. The delay circuit 47 comprises a random access memory (RAM), which temporarily stores the red image signal 42 for a period of time corresponding to the number of lines constituting the shift in printing position between the black printing section 46 and the red printing section 48. The red image signal 42, thus delayed, is applied to the red printing section 48, so that the data may be recorded in red on the recording sheet 26. The red recording section 48 is similar in arrangement to the black recording section 46 except that the ink pigment or dye coated on the ink donor sheet in the former section is different in color from that coated on the ink donor sheet in the latter section.

The cyan image signal 44 outputted by the third AND circuit is supplied to a cyan image signal delay circuit 49, where it is delayed before being applied to a cyan printing section 51. Similarly, the cyan image signal delay circuit 49 comprises a random access memory; however, its memory capacity is larger than that of the red image signal delay circuit 47 because the delay circuit 49 must delay the cyan image signal for a period of time corresponding to the number of lines constituting the shift in printing position betweeen the black printing section 46 and the cyan printing section 51. The cyan printing section 51 is similar in construction to the black printing section 46 except that the ink pigment or dye on the ink donor sheet in the former section is again of a different color from that on the ink donor sheet in the latter section. In the cyan printing section 51, data is recorded in cyan.

The printing sections 46, 48 and 51 carry out printing operation as described above. Therefore, as the recording sheet 26 is auxiliary-scanned in the direction of the arrow at a predetermined speed, data are recorded in black, red and cyan in the stated order. When the data have been printed, the recording sheet is delivered to a discharging tray (not shown), and the copying machine is ready for the next copying operation.

As is apparent from the above description, according to the invention, data can be recorded in three colors including black, with only two image sensors, which makes it possible to reduce the manufacturing cost of the copying machine. Furthermore, as data can be recorded in a particular color and its complement, the recorded image is improved in visual clarity.

In the above-described embodiment, the particular color was red and the complement was cyan; however, the technical concept of the invention may be similarly applied to the combination of blue and yellow, and also to the combination of green and magenta.

Furthermore, in the above embodiment, data are recorded in three colors according to a thermal transfer type recording system; however, three-color recording can be conducted according to an ink jet system or other recording systems. In these cases, it goes without saying that, where the three color recording positions coincide with one another, the image signal delay circuits may be omitted.

What is claimed is:

1. A three-color copying machine, comprising:

an optical system for forming an image of the picture data of an original at predetermined positions;

first wavelength selecting means for selecting the wavelength component of a particular color other than black;

second wavelength selecting means for selecting at least the wavelength component of the color complementary to said particular color;

a first image sensor for performing photo-electric conversion at one said predetermined position with respect to said wavelength selecting means with the aid of said optical system;

a second image sensor for performing photo-electric conversion at a second said predetermined position with respect to said wavelength component selected by said second wavelength selecting means with the aid of said optical system;

a signal processing means for subjecting image signals outputted by said image sensors to binary-encoding and logical operations, to provide image signals representing black, said particular color and said complementary color; and recording means for receiving said image signals from said signal processing section to perform recording in said colors, respectively.

2. An apparatus as claimed in claim 1, wherein said first and said second wavelength selection means both comprise a single dichroic mirror for reflecting wavelength components other than those of said particular color.

3. An apparatus as claimed in claim 1, said recording means comprising thermal recording sections, and further including delay means for delaying two of said image signals for respective amounts of time corresponding to the shifts in printing position between said recording sections.

4. An apparatus as claimed in claim 1, said signal processing means comprising means for forming the logical product of binary encoded outputs of said first and second image sensors, to form said black image signal.

5. An apparatus as claimed in claim 4, further including means for forming the logical product of a binary encoded output of said first image sensor and a binary encloded inverted output of said second image sensor, to form said complementary color image signal.

6. An apparatus as claimed in claim 5, and further including means for forming the logical product of a binary encoded, inverted output of said first image sensor and a binary encoded output of said second image sensor, to form said particular color image signal.

* * * * *